Oct. 28, 1958     A. M. STOTT     2,857,890
THRUSTER WITH DAMPER
Filed Oct. 7, 1957
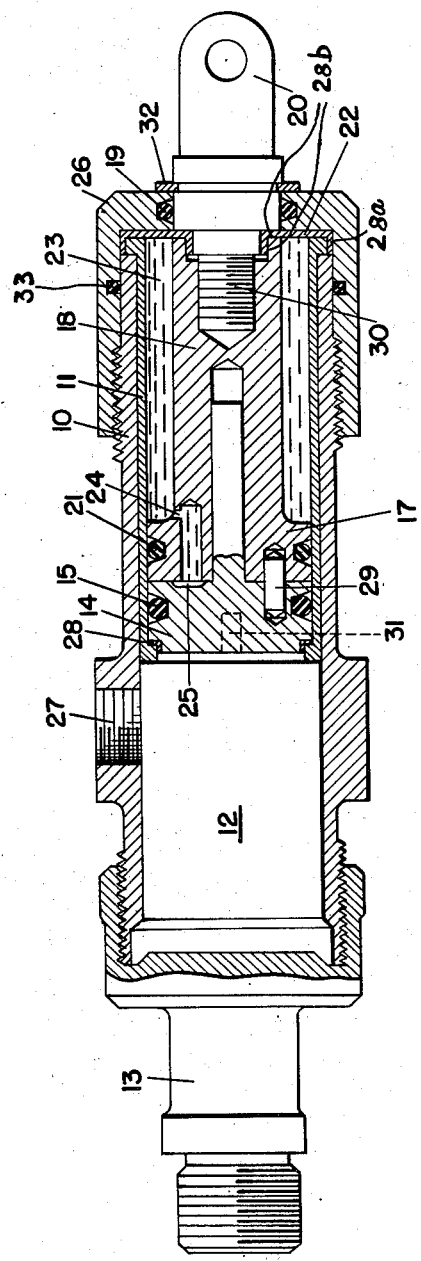
INVENTOR.
ALBERT M. STOTT

2,857,890
THRUSTER WITH DAMPER

Albert M. Stott, Aldan-Clifton Heights, Pa.

Application October 7, 1957, Serial No. 688,795

5 Claims. (Cl. 123—24)

(Granted under Title 35, U. S. Code (1952), sec. 266)

The invention described herein may be manufactured and used by or for the Government for governmental purposes without payment of any royalty thereon.

This invention relates to a cartridge actuated thruster and has for an object to provide such a device that is simple, compact and capable of being stored for an indefinite period without danger of leakage of liquid. Another object is to provide an improved device of this sort in which the outward movement of the piston rod is subjected to a damping or speed reduction immediately upon starting.

This invention is an improvement of that disclosed by the prior application of Messrs. Stott and Magnus S. N. 644,426 filed March 6, 1957, for "One Stroke Thruster With Speed Reducer."

The single figure of the drawing illustrates a longitudinal section through a preferred embodiment of this invention.

The device illustrated includes an outer cylinder or casing 10 and an inner cylinder 11. At the left end of the cylindrical outer casing is illustrated a cartridge case 12 which may be actuated by some pressure responsive firing pin within a firing head assembly 13 or in any other convenient manner. A floating piston 14 is provided with an O ring 15 and a guide rod 16 projecting into the main piston 17 and piston rod 18. At the right end of the piston rod 18 is shown O ring 19 within the end cap. An end fitting 20 depends upon the nature of the load to be moved by the thruster. The main piston 17 also has an O ring 21 as illustrated. At the right end of the inner cylinder 11, the shear disc 22 is shown as being provided with a radially inner end portion which is anchored and secured within the piston rod 18. This is made possible by having the piston rod in two parts threaded together as will be described herein later.

Between the piston rod 18 and the inner casing 11 is the liquid chamber 23. At its left end this liquid chamber has been provided with a constricted passageway 24 through which the liquid in the chamber 23 may be forced as the piston moves to the right. From the constriction 24 liquid moves through the passageway illustrated into the chamber 25 between the floating piston 14 and the main piston 17. Headed onto the outer cylinder is the cap 26, and at 27 is shown a connection leading from within the outer cylinder for any test apparatus that may be desired. A seal 28 of solder or plastic is placed between the left end of the inner cylinder 11 and the periphery of the floating piston 14. A similar seal 28a is placed between the disc 22 and the inner and outer right end of the inner cylinder 11, also, the seal 28b is placed between the disc 22, rod end 20 and piston rod 18. A pin 29 extends between the floating piston 14 and the main piston 17 solely for the purpose of preventing relative rotation between them and not for any purpose of limiting relative longitudinal movement between these pistons.

Before the end cap 26 and the end fitting 20 are attached to the casing 10 and piston rod 18 respectively, the end wall of the inner cylinder 11 has its radially inner end bent inwardly as illustrated. The outer end portion of the piston rod 18 including the end fitting 20 is then connected to the inner portion of the piston rod 18 by a threaded connection 30 as illustrated. For this purpose, the end fitting 20 may be placed in a vice or other means of preventing it from rotating and a spanner wrench inserted into the floating piston 14 in the holes 31 for the purpose of rotating both pistons and the main piston rod 18 onto the threads of the outer end portion of the piston rod. This, of course, must be done before the firing head assembly 13 has been put in place or threaded on to the outer casing. To prevent the outer end portion of the piston rod 18 from being drawn too tightly inward and therefore deforming the end wall of an inner casing, a retaining ring 32 is placed upon this outer end of the piston rod for the purpose of limiting the amount of inward movement it can receive. O ring 33 is provided to reduce the danger of liquid leaking to the outside in event the sealant might leak.

By floating piston is meant one which is without any solid connection to the main piston but has only the fluid connection between them. The preferred embodiment illustrated has approximately a 2 inch stroke, is about 1⅝ inches in diameter and is about 11 inches overall. It is intended for use on a personnel escape capsule and for other purposes. Its velocity of outward movement has been reduced to about 6 inches per second. A suitable size for the constriction 24 is about .038 inch. The term piston and piston rod are intended to include also a plunger which has no sharp line of demarcation between its piston and piston rod.

On firing the cartridge 12, gas pressure moves the floating piston to the right breaking the seal 28 between it and the inner casing 11. The floating piston 14 may move the main piston 17 by direct contact initially or through the interposition of the liquid between them. Before outward movement of the piston rod 18 is possible, the end wall of the disc 22 must be sheared and this depends on the predetermined pressure acting upon the piston rod. Inasmuch as the liquid chamber 23 is initially filled with liquid, the first movement of the piston after rupture of the disc 22 is effective in putting a high pressure on the liquid and forcing it through the constricted orifice 24 and into the space 25 between the floating and main pistons. It is essential that the area of the main piston in contact with the liquid in the chamber 23 be smaller than the area of contact between the same liquid upon the opposite face of the main piston so that the liquid in the chamber 23 may be under a higher pressure than that existing upon the liquid between the floating and main pistons. The embodiment illustrated is intended to function only as a single-stroke thruster, there being no retraction of the piston rod contemplated.

Among the advantages of this invention may be mentioned the fact that the thruster is more compact and of shorter length than that of the prior invention of Messrs. Stott and Magnus mentioned above. No rubber bag containing the liquid is needed. The liquid in the chamber 23 is initially filling substantially the entire chamber so that there is no delay in reducing piston speed immediately upon outward movement of the piston. There are no gas pockets or cushions formed in the liquid chamber and no delay is encountered in filling this chamber with liquid. A hermetic seal is provided between the inner cylindrical casing 11 and the floating piston 14 so that there is no danger of liquid leaking before the application of pressure on firing the cartridge. Another feature of the present invention as compared with the prior thruster is the simplification in construction by elimination of the need for a check valve being used between the high pressure liquid chamber and the lower pressure chamber for liquid between the floating and main pistons. A further feature of this invention is a low expansion ratio, i. e., the ratio of the initial volume to the final gas volume at the completion of the stroke. This ratio harmonizes with the type of propellant used.

I claim:

1. In a single stroke cartridge actuated thruster having a gas chamber for products of combustion from a cartridge, a floating piston against which the gaseous products of combustion impinge, a main piston actuated by said floating piston, a chamber for a liquid between said pistons, a casing enclosing said chambers and pistons, another liquid chamber within said casing on an opposite side of said main piston from the first mentioned liquid chamber, and a constricted passageway for liquid between said liquid chambers, the second mentioned liquid chamber being of smaller cross sectional area in contact with the main piston than is the first mentioned liquid chamber, whereby the pressure in the second liquid chamber is higher than that in the first liquid chamber and said second liquid chamber is effective in slowing the speed of the main piston by an amount depending largely on the cross sectional area of said constricted passageway, the combination therewith of the improvement for shortening the length of said thruster, said improvement including said floating piston being substantially contiguous the main piston at the beginning and only at the beginning of the power stroke of said main piston, the separation of the floating and main pistons increasing as the main piston advances in its stroke, said increasing separation between the pistons resulting from movement of liquid from the second liquid chamber through said constricted passageway into the first liquid chamber.

2. In a thruster, a source of gas under pressure, an enclosing casing, a floating piston in said casing exposed on one side to said gas under pressure, a second piston in the casing, a rod from the second piston adapted to be driven outwardly under load, a liquid chamber between said pistons, a liquid buffer chamber between the second piston and an end of said casing toward which said second piston moves during a power stroke, the liquid within said buffer chamber being exposed to a smaller area of said piston than is the liquid between said pistons, and a constricted passageway between said buffer chamber and the liquid chamber between said pistons whereby on outward movement of said rod, liquid may flow from said buffer chamber through said constricted passageway into the chamber between said pistons to increase stroke of the second piston with respect to the floating piston and reduce the speed of the second piston, the combination therewith of the improvement for enhancing the leakproof character of said thruster prior to its being used, said improvement including a hermetically sealed inner casing having an open end exposing said floating piston to gas pressure from said source, the floating piston being frangibly sealed to the open end portion of said inner casing, and the opposite end portion of said inner casing extending into a portion of said rod which is adapted to be driven out of said casing, and said end portion of the inner casing being sheared by said piston rod as the same is forced outward, the outer casing being under tension during the power stroke of the thruster but the inner casing being under substantially little tension after rupture of the seal between the inner casing and floating piston and after shear of the opposite end portion of the inner casing by said piston rod.

3. The combination of an outer cylinder, an inner cylinder having a shearable end wall, a main piston having a rod fixed to said end wall and arranged to form with said inner cylinder a first liquid chamber, means mounted in said outer cylinder for generating a gas under pressure, a floating piston movable by said pressure to activate said main piston and arranged with said inner cylinder and said main piston to form a second liquid chamber, and means forming a restricted passageway between said chambers whereby the initial movement of said main piston is retarded.

4. The combination of an outer cylinder, an inner cylinder having a shearable end wall, means mounted in said outer cylinder for generating a gas under pressure, a main piston having a rod fixed to said end wall and arranged to form with said inner cylinder a first liquid chamber, a floating piston movable by said pressure to activate said main piston and arranged with said inner cylinder and said main piston to form a second liquid chamber, said rod having a tubular section and said floating piston having a rod extending into said section, and means forming a restricted passageway between said chambers whereby the initial movement of said main piston is retarded.

5. A combination according to claim 4 wherein said pistons have opposed recesses, and a pin extending into said recesses.

References Cited in the file of this patent

UNITED STATES PATENTS

| 2,140,214 | Temple | Dec. 13, 1938 |
| 2,420,987 | Temple | May 20, 1947 |

FOREIGN PATENTS

| 235,676 | Great Britain | Jan. 1, 1925 |
| 545,906 | Great Britain | June 18, 1942 |